July 14, 1970          3,520,591
MULTIPLE-PASS LIGHT DEFLECTOR
Filed April 17, 1967          2 Sheets-Sheet 1
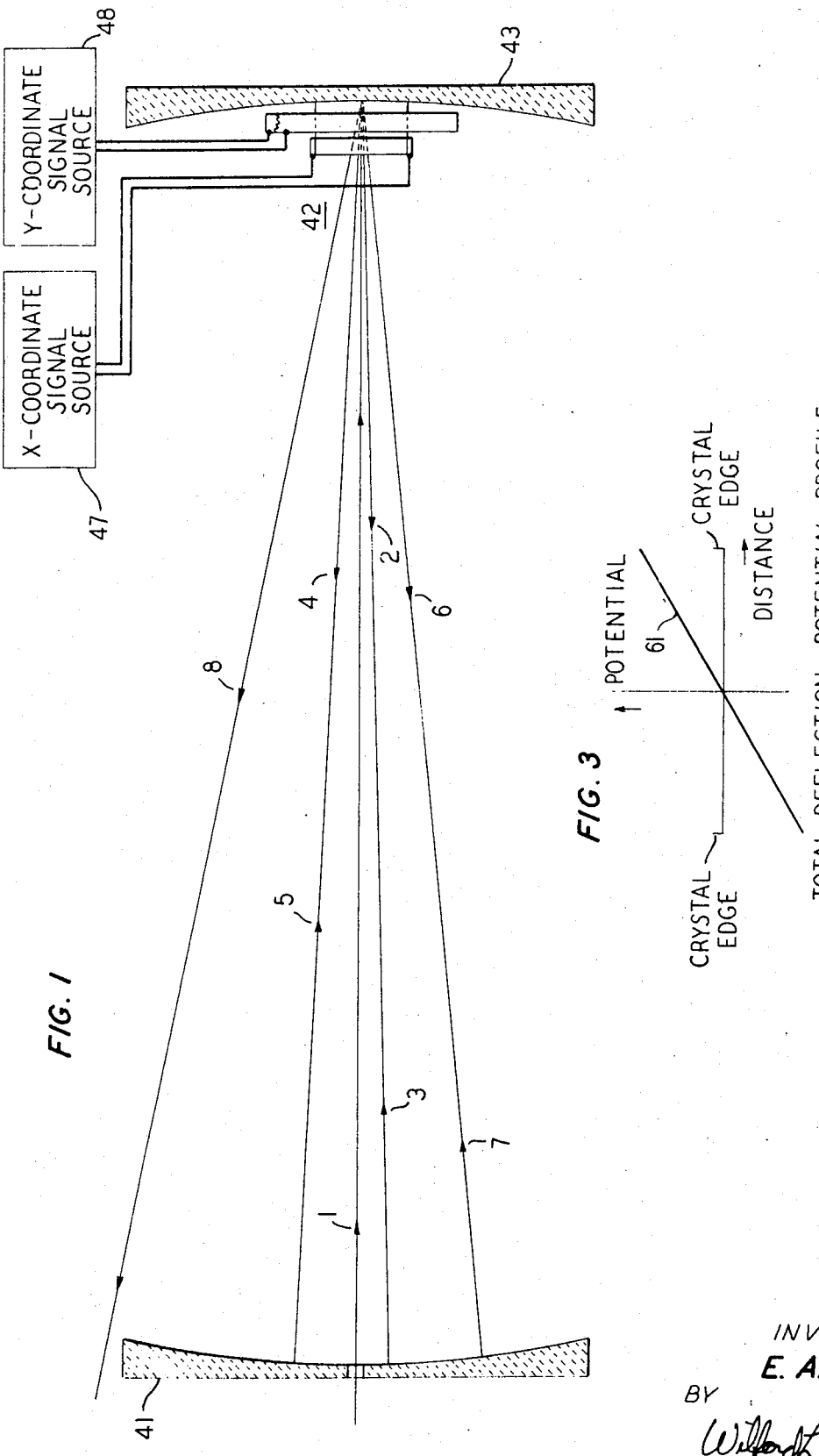
INVENTOR
E. A. OHM
BY
Wilford L. Wiese
ATTORNEY

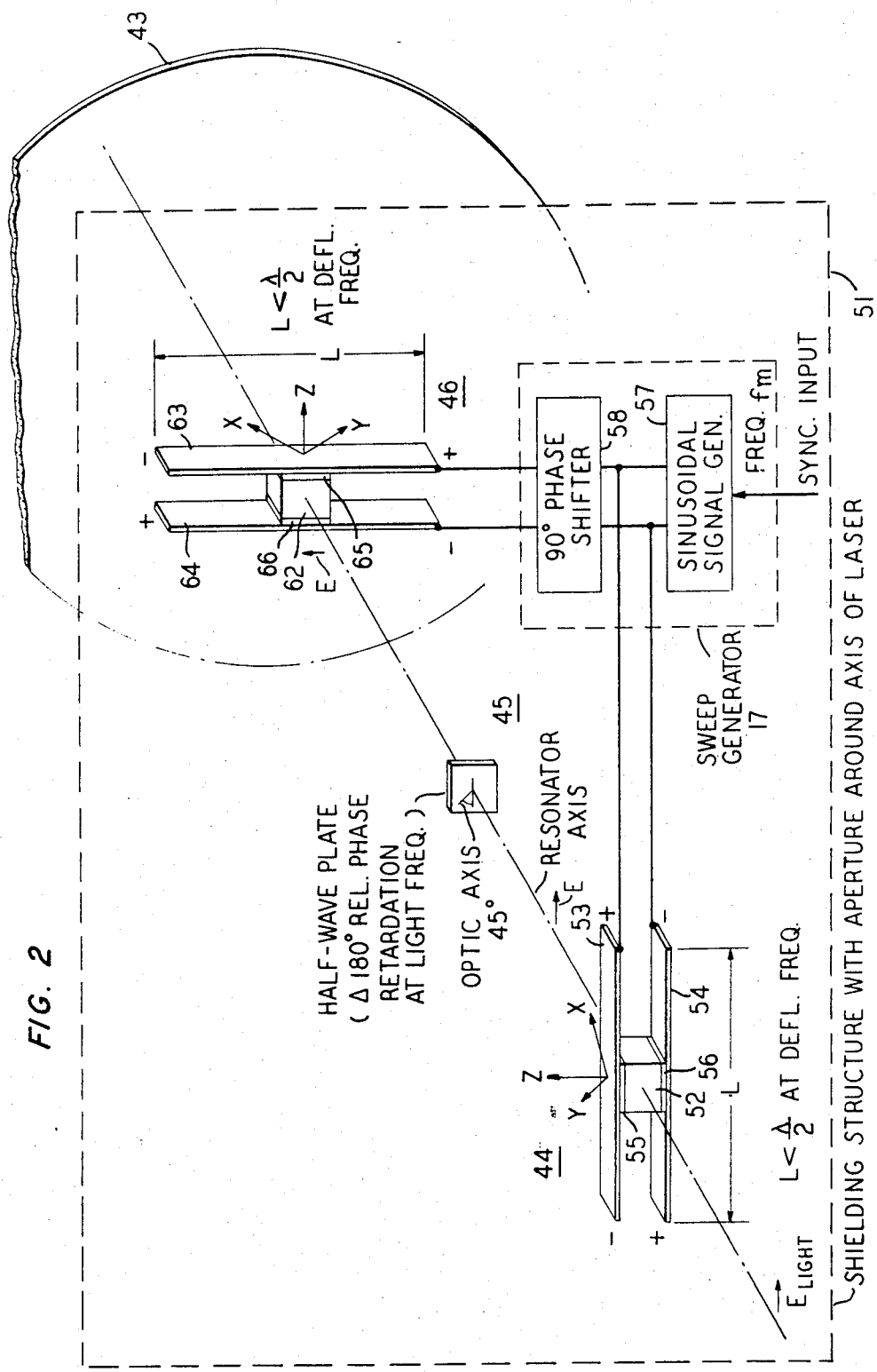

United States Patent Office 3,520,591
Patented July 14, 1970

---

3,520,591
MULTIPLE-PASS LIGHT DEFLECTOR
Edward A. Ohm, Eatontown, N.J., assignor to Bell
Telephone Laboratories, Incorporated, Murray
Hill, N.J., a corporation of New York
Filed Apr. 17, 1967, Ser. No. 631,505
Int. Cl. G02f 1/26
U.S. Cl. 350—150                            2 Claims

ABSTRACT OF THE DISCLOSURE

High-speed electro-optic deflection at substantial deflection angles is obtained by employing substantially confocal mirror arrangements providing multiple-pass operation in the deflector. Electro-optic crystals are mutually oriented for two-coordinate deflection and are positioned near one of the mirrors opposite a central aperture of the other mirror. They are separated by a half-wave plate and are driven through strip line arrangements that are out of the light beam paths. The deflection of the beam is increased during every pass between the mirrors; and the confocal relationship of the mirrors causes the deflected beam to return to the electro-optic crystals until it misses one of the mirrors. The apparatus is useful in optical transmission systems and is well-adapted for optical time-division multiplex systems.

CROSS-REFERENCES TO RELATED APPLICATIONS

This application is filed concurrently with the joint application of Messrs. S. J. Buchsbaum and R. Kompfner and the sole application of Mr. R. Kompfner, Ser. Nos. 631,301 and 631,394, respectively, both filed Apr. 17, 1967 and assigned to the assignee hereof.

BACKGROUND OF THE INVENTION

This invention relates to apparatus for deflecting and modulating light beams with a substantial range of deflection angles.

The evolving technology directed toward optical systems has shown that deflection and modulation of light with a substantial range of deflection angles, greater than a range of the order of a few degrees, can typically only be obtained by mechanically driven or electromechanically driven deflectors. Yet these types of deflectors are too slow for use in the types of many systems now typically envisioned.

For example, in the communications system disclosed in the above-cited, concurrently-filed application of Messrs. S. J. Buchsbaum and R. Kompfner, the deflection repetition rate is the same as the optical multiplexing frequency. Full utilization of the information-carrying capacity of such a system depends upon the availability of multiplexing frequencies that are typically much higher than the maximum repetition rates of mechanical or electromechanical deflectors.

Nevertheless, any electro-optic deflector that could provide repetition rates in the range of interest does not now provide a sufficiently large range of angles of controllable deflection.

One solution to this basic problem is recognized in the above-cited sole application of R. Kompfner to involve a multiplying light deflector. One embodiment disclosed in that application comprises the combination of two substantially confocally spaced focusing reflectors and electro-optic deflection apparatus disposed at the common focal point therebetween and driven to increase the deflection of an entering light beam once during each two passes between the reflectors. The deflection will be increased on each round trip if the half-period of the driving signal equals the time needed for each two passes.

A basic principle involved in the operation of that deflector is that, since a substantially confocal arrangement of reflectors can support a large number of modes as a resonator, the non-reentrant pattern traced by the beam is determined solely by the diameter, convergence and direction of the beam upon entry and the single-pass deflection.

I have attacked the problem that the disposition of the electro-optic modulators at the common focal point of the two curved reflectors allows the beam to be deflected only on alternate passes and causes the deflected beam to be blocked from a large number of otherwise usable paths. In addition, it requires the first deflection of the input beam to be so large that only a relatively small number of passes of the beam between entry and exit can be achieved.

SUMMARY OF THE INVENTION

According to my invention, the foregoing problems are solved by disposing the deflection apparatus in the vicinity of one reflector to intercept the beam in both directions of propagation.

In a specific embodiment of my invention, the deflection apparatus includes two electro-optic crystals separated by a half-wave plate and energized from strip lines in balanced or symmetrical arrangements that do not block the deflected beam. The deflection apparatus is energized to produce periodically reversing, substantially linear variations in refractive index with respect to lateral position in the apparatus. The reflector near which the deflection apparatus is located has substantially an odd confocal spacing from the entrance point of the light beam on the axis of the reflectors.

As compared to the disposition of the deflection apparatus at the common focal point of the confocal reflector arrangement, my invention has several characteristics that may be advantageous in particular applications. Four of the most significant are the following. First, deflection angles are multiplied twice as rapidly since every pass between the reflectors provides one pass through the active elements of the apparatus, whereas every two passes between reflectors in the former apparatus provide one pass through the active elements. Second, the minimum allowable increment of deflection is smaller, since it is determined by an aperture rather than lateral dimensions of the active elements. Third, power efficiency is higher. Fourth, no possible paths of the deflected beam are blocked by the energizing electrodes or associated apparatus.

BRIEF DESCRIPTION OF THE DRAWING

FIG. 1 is partially pictorial and partially block diagrammatic illustration of a first embodiment of my invention;
FIG. 2 is an exploded perspective view of the active components of the light deflector of FIG. 1; and
FIG. 3 shows a typical deflection potential profile in the deflection coordinate for one of the electro-optic crystals of FIG. 2.

DESCRIPTION OF ILLUSTRATIVE EMBODIMENTS

In FIG. 1, it is assumed that a beam of light, preferably coherent, approaches the illustrated deflection apparatus from the left, along the common axis of the focusing reflectors 41 and 43. It is desired to deflect this beam with a controllable conical scan to pass beyond the edges of reflector 41.

Basically, multiplication of the small electro-optic deflectors are obtained in the embodiment of FIG. 1 by bouncing the deflected beam a number of times off the confocally spaced mirrors 41 and 43, while varying the deflecting signals applied to apparatus 42 from the X-coordinate signal source 47 and the Y-coordinate signal source 48 periodically at appropriate frequencies.

The operation of the deflector of FIG. 1 can be described as follows. Assume that a coherent narrow light beam enters the deflector through a central aperture or uncoated portion of the mirror 41. The deflection apparatus 42 is suitably energized with X and Y-coordinate deflection signals, 90° out of phase and of equal amplitude. The beam, before it strikes the reflector 43, would be deflected by apparatus 42 through some small angle, θ. The beam is slightly obliquely incident at the reflector 43 (although this is very difficult to show in the drawing), so that the beam will propagate back through the apparatus 42 along bent path 2 at an angle on the other side to the normal to reflector 43 with respect to its direction of incidence along bent path 1. The beam will continue to be bent in the same direction in path 2 as it was in 1. The net result of the double pass through deflection apparatus 42 will be a total deflection through an angle 2θ.

The beam propagates substantially along a radius of reflector 41 both in propagating toward reflector 41 and in returning from it. Thus, the beam returns to deflection apparatus 42 for the next deflection.

The phase of the signals in apparatus 42 has changed by 180° in the interim, so that the beam is now bent upward and is deflected along path 4, on the other side of the axis. The angle is increased because the beam arrives at apparatus 42 at a more oblique angle each time than the time before. Eventually, the beam exits past reflector 41. Subsequent portions of the continuously entering beam exit past other portions of reflector 41 in a continuous conical scanning sequence. The scan is continuous in the sense that it produces a moving spot on any intercepting plane.

An advantage of the deflector of FIG. 1 is that the curvature of the mirrors prevents spreading of the light beam due to diffraction. Further, if the beam is introduced at the aperture of mirror 41 with an extremely small waist, or diameter, it can be efficiently deflected in the apparatus 42 at mirror 43 at a somewhat large diameter and still emerge as an output beam at mirror 41 with the same small waist that it had initially.

The X-coordinate signal sources 37 and 47 and the Y-coordinate signal sources 38 and 48 in FIGS. 1 and 2 are conventional sources of equal-amplitude sinusoidal signals of like frequency. In order to produce a circular trace in a plane normal to the axis of the deflector, the X-coordinate and Y-coordinate signals in each embodiment are synchronized to be 90° out of phase.

A preferred construction of the apparatus 42 is shown in the exploded view of FIG. 2. It is assumed that the horizontal deflection stage 44 is farthest from the mirror 43 and that the vertical deflection stage 46 is immediately adjacent to the mirror 43.

The horizontal deflection stage 44 comprises the electro-optic crystal 52, illustratively a KDP (potassium dihydrogen phosphate) crystal having its Z-crystalline axis oriented orthogonal to the plane including the axis and the desired deflection coordinate and having its X and Y-crystalline axes both oriented at angles at 45° with respect to the common axis in the plane of the axis and the desired deflection coordinate. Crystal 52 is energized by the X-coordinate deflection signal through the symmetrically disposed strip lines 53 and 54, each of which is slightly less than a half wavelength long at the deflection frequency, $f_m$, and is oriented parallel to the direction of the desired deflection coordinate. Strip line 54 is separated from crystal 52 by the metal step 55 and the strip line 53 is separated from crystal 52 by the metal step 56. These metal steps help to shape the driving electric field distribution, which distribution will be described hereinafter. The symmetrical disposition of the strip lines 53 and 54 provide an effective ground plane halfway therebetween. The application of power through the strip lines 53 and 54 to the crystal 52 is facilitated by the presence of the shielding structure 51 which encompasses both deflection stages except for the needed aperture for the deflected beam.

Between deflection stage 44 and deflection stage 46 there is inserted a half-wave plate 45 which is illustratively a calciate crystal cut to have appropriate thickness at the desired modulating frequency and to have parallel major faces that are oriented orthogonally to the common axis of the deflector. These major faces are cut parallel to the optic axis of the crystal which is oriented at 45° with respect to both of the desired deflection coordinates as indicated. The plate 45 produces 180° relative phase retardation between polarization components respectively parallel and perpendicular to the optic axis as they pass therethrough.

The vertical deflection stage 46 comprises the crystal 62, the symmetrically disposed half wavelength strip lines 63 and 64, and metal steps 65 and 66, all of which are comparable to the elements of deflection stage 44 which are numbered with numbers ten digits lower. It may be seen that deflection stage 46 is effectively the same as deflection stage 44 rotated 90° in a plane orthogonal to the common axis.

In the operation of the deflection stages of FIG. 3, the X-coordinate deflection signal is applied to the strip lines 53 and 54 so that the former has a positive-to-negative voltage gradient in one direction when the other has a negative-to-positive voltage gradient in the same direction. Both gradients have the same potential at a point midway between the ends, directly above and below the center of crystal 52, respectively. These voltage gradients are sustained on the strip lines 53 and 54 because they are approximately a half wavelength long at the modulating frequency $f_m$ and behave as transmission lines at that frequency. With the crystal 52, the effects of the voltage gradients produced by strip lines 53 and 54 are additive so that the total voltage difference across crystal 52 at any X-coordinate point therein is twice as great as would be produced by one of the strip lines alone. The voltage profile, which is a plot of these voltage differences, within crystal 52 varies from left to right in substantially a linear manner as shown in FIG. 4, in which the negative position of curve 61 represents a voltage which is negative at strip line 53 and positive at strip line 54 and the positive position represents a voltage which is positive at strip line 53 and negative at strip line 54.

It should be understood that each of the voltage profiles across crystals 56 and 66 varies in slope continuously between that shown and an equal negative slope at the deflecting frequency $f_m$.

The light input to deflection stage 44 is assumed to be polarized in the X direction in order to obtain the maximum response to the voltage profile. The voltage profile produces a deflection effect exactly analogous to a left-to-right density profile shaped as shown by curve 61 of FIG. 3. In more theoretical terms, the voltage profile produces a corresponding profile, or lateral variation, of the index of refraction.

The half-wave plate 45 converts the polarization of the light from an X-axis polarization to a Y-axis polarization in order to make the light as responsive as possible to the index-of-refraction profile that is obtained in vertical deflection stage 46 in a manner similar to that of the horizontal deflection stage 44. The light beam will be bent toward the region of the highest index of refraction of crystal 52, illustratively to the right in the drawing, and will be bent toward the region of highest index of refraction in crystal 62, illustratively in the downward direction. After a slightly oblique reflection from the mirror 43, the beam will experience additional deflections in the same directions upon its reverse passage through crystals 62 and 52. During the reverse passage, the half-wave plate 45 converts the vertical polarized light emerging from crystal 62 into horizontal polarized light entering crystal 52.

In employing the deflector of FIGS. 1 and 2 in typical optical systems, it may be desired that the input light beam from laser 11 be reflected from one or more mirrors in order to enter the input aperture or that the output beam be redirected with one or more mirrors into a transmission medium or utilization apparatus, since entry and exit occur at the same end of the deflection apparatus.

Other usable potential profiles for the purposes of the present invention can also be created with the electrode arrangements described by V. J. Fowler et al., in their note "Electro-Optic Light Beam Deflector," Proceedings of the Institute of the Electrical and Electronics Engineers, volume 52, page 193, at page 194 (FIG. 2), February 1964.

What is claimed is:

1. Apparatus for the deflection of a beam of polarized coherent light, comprising
   a multiple-pass substantially confocal optical assembly including a pair of spaced reflectors opposed along a common axis and means for introducing said beam at substantially a confocal spacing on said axis from one of said reflectors, and
   means for deflecting said beam during the course of each pass between said reflectors in the vicinity of said one reflector, said deflecting means including
      a source of at least one signal of frequency substantially equal to a frequency of half period equal to the time elapsed while the beam makes two passes between said reflectors and
      two active elements coupled to said source to respond to said signal with substantially a 90° phase difference to deflect the beam in each of two orthogonal coordinates by additive increments during two consecutive, oppositely directed passes through said elements, said elements having first effective diameters, the other of said reflectors having substantially a confocal spacing from said one reflector and having a second effective diameter substantially larger than said first effective diameters.

2. Apparatus of the type claimed in claim 1 in which the deflecting means includes strip line electrodes coupling the signal source to the active elements, said strip line electrodes having a virtual ground plane therebetween and having equal lengths which are less than and nearly equal to a half wavelength at the signal frequency.

References Cited

UNITED STATES PATENTS

| 3,305,292 | 2/1967 | Miller | 350—150 |
| 3,439,975 | 4/1969 | Smith | 350—150 |

OTHER REFERENCES

Herriott et al., "Folded Optical Delay Lines," Applied Optics, vol. 4, No. 8 (August 1965), pp. 883—889.

DAVID SCHONBERG, Primary Examiner

P. R. MILLER, Assistant Examiner

U.S. Cl. X.R.

350—157, 160